United States Patent [19]

Takahashi et al.

[11] Patent Number: 4,986,317
[45] Date of Patent: Jan. 22, 1991

[54] METHOD FOR MAKING ELECTRODE PLATE FOR LEAD STORAGE BATTERIES

[75] Inventors: Katsuhiro Takahashi, Toyahashi; Kazuyoshi Yonezu, Kosai; Hiroshi Yasuda; Ichiro Sano, both of Toyohashi; Toshiaki Kimura, Kosai, all of Japan

[73] Assignee: Matsushita Electric Industrial Co., Ltd., Osaka, Japan

[21] Appl. No.: 315,689
[22] PCT Filed: Jun. 16, 1988
[86] PCT No.: PCT/JP88/00587
§ 371 Date: Apr. 19, 1989
§ 102(e) Date: Apr. 19, 1989
[87] PCT Pub. No.: WO88/10518
PCT Pub. Date: Dec. 29, 1988

[30] Foreign Application Priority Data
Jun. 19, 1987 [JP] Japan .................. 62-153669

[51] Int. Cl.$^5$ ............................ H01M 6/00
[52] U.S. Cl. ........................ 141/1.1; 141/32; 29/623.5; 429/228
[58] Field of Search ............ 141/1.1, 32, 33; 29/623.5; 429/225, 228

[56] References Cited

U.S. PATENT DOCUMENTS 2,035,315 3/1936 Horner et al. .............. 429/228
2,422,437 6/1947 Plews .
2,555,301 6/1951 Chubb ..................... 141/1.1
3,943,004 3/1976 Honer et al. .............. 429/228

FOREIGN PATENT DOCUMENTS 3038440 6/1982 Fed. Rep. of Germany .
0197662 11/1983 Japan ..................... 429/228

OTHER PUBLICATIONS

Arendt, "Storage Batteries", (1928), p. 42.
Patent Abstracts of Japan, vol. 9, No. 219 (M-140) [1942], 6 Sep. 85; & JP-A-60 79 669 (Sankyo Denki K.K.) 07-05-1985.
Patent Abstracts of Japan, vol. 6, No. 32, (E-96) [910], 26 Feb. 1982; & JP-A-56 152 165 (Shinkoube Denki K.K.) 25-11-1981.
Journal of the Electrochemical Society, vol. 131, No. 3, Mar. 1984, pp. 483-487, E. J. Taylor et al: "A Precharged Positive Plate for the Lead-Acid Automotive Battery".
Journal of Electrochemical Society, vol. 98, No. 12 (1959), pp. 474-478.

*Primary Examiner*—Ernest G. Cusick
*Attorney, Agent, or Firm*—Stevens, Davis, Miller & Mosher

[57] ABSTRACT

This invention relates to a method of producing a paste-type electrode for a lead storage battery which comprises packing into an active material support a paste prepared by kneading a lead oxide having a conversion ratio to red lead ($Pb_3O_4$) of 90% or less or a mixture of this lead oxide powder with water and sulfuric acid as the principal components. Because this lead oxide contains red lead less than 90%, red lead formed on the surface of this oxide and lead oxide (PbO) formed in the particle core are directly bonded. This enhances the bonding power between the active materials. The paste-type electrode prepared by this method provides high adhesion of the paste to the active material support and high bonding power between the active materials. Therefore, both improvements in life and in efficiency of formation charge can be attained.

5 Claims, 2 Drawing Sheets

F I G. 1
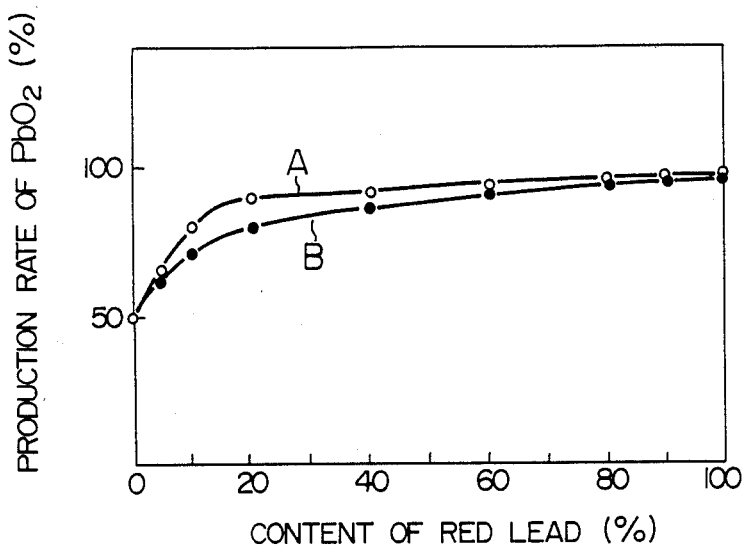
F I G. 2
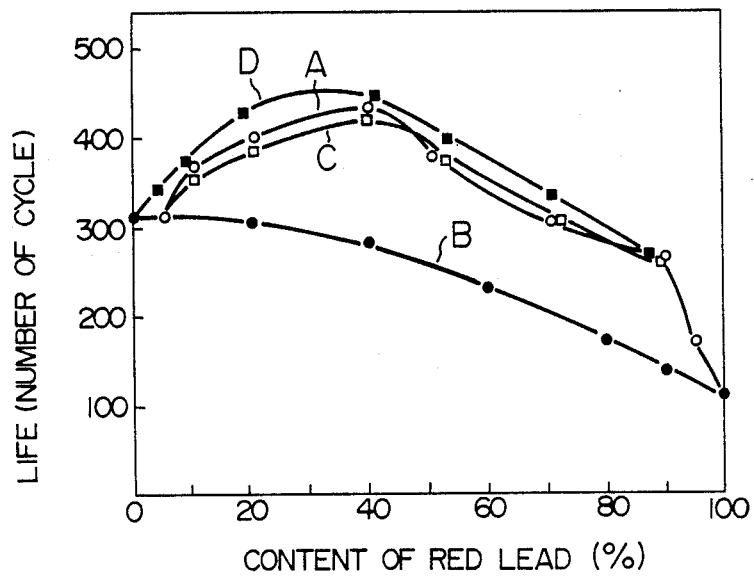

METHOD FOR MAKING ELECTRODE PLATE FOR LEAD STORAGE BATTERIES

TECHNICAL FIELD

The present invention relates to a method for making an electrode plate for lead storage batteries and more particularly to attainment of efficient formation charging of paste-type electrode plate and improvements of both the working characteristics and the reliability of battery when the paste-type electrode plate is used in lead storage batteries.

BACKGROUND ART

In lead storage batteries, there are commonly used paste-type electrode plates made by coating a paste prepared by kneading a partially oxidized lead powder, water and sulfuric acid as main components, a short fiber of synthetic resin, a fine powder of carbon, organic additives and, if necessary, small amounts of other components on a continuous porous body such as a cast grid, a punching sheet, an expanded metal or the like, and, if necessary, cutting it to shapes of electrode plate, followed by drying. This electrode plate is combined with a separator and an electrode plate assembly is made therefrom. The assembly is placed in a cell, to which dilute sulfuric acid as an electrolyte is added and formation of the electrode plates is carried out in the cell. Alternatively, electrode plates are subjected to formation outside the cell and then are placed in the cell to impart a function of battery. It is generally known to add red lead, namely, $Pb_3O_4$ which is a high grade oxide in order to avoid loss of power and time because efficiency of formation is low especially at a positive electrode in the stage of formation of electrode plate.

When red lead is applied to a paste-type electrode plate, efficiency of formation charging increases with increase in the amount of red lead and a lead storage battery made using such electrode plates is improved in initial working characteristics, but tends to deteriorate the life of the battery. Therefore, red lead is used commonly for a cladding-type electrode plates comprising a porous tube in which an active material is packed, but in practice it is hardly used for paste-type electrode plates of the type which are predominantly used at present. A few attempts have been tried to form a red lead layer on an electrode plate for a special purpose and but this has not yet been of practical use.

Generally, for mass production, red lead is prepared by further firing (oxidizing) a lead powder in which a part or the whole of lead has been oxidized into lead monoxide (PbO). Ratio of Pb converted to $Pb_3O_4$ is taken as conversion ratio to red lead here.

The above-mentioned deterioration in life of the battery occurs under the condition that in the course of production of red lead through oxidation of a lower oxide such as lead monoxide (PbO), at least 95% of Pb is converted to red lead according to conception of grade of red lead. Red lead of such grade has been used as the additive. However, this red lead is lower in reactivity with sulfuric acid than the ordinary lead power of 60–80% in oxidation degree and besides, has a hard surface and becomes excessively porous and gives an adverse effect on binding power between pasty active materials per se at coating on a support, aging of the paste and working as a battery.

It is considered that the above properties are also influenced by graduation effect or increase of hardness of secondary particles when lead powder is exposed to high temperature for a long time at the final stage of enhancing the conversion ratio to red lead to 95%.

The object of the present invention is to solve the problem of deterioration in the life of a battery which occurs opposite to the advantage of improvement in efficiency of formation charging when the above-mentioned red lead is added to the paste.

DISCLOSURE OF INVENTION

As a specific means to solve the above problem, the present invention is characterized in that a paste prepared by kneading a lead powder containing a lead oxide having a conversion ratio to red lead of 90% or less, water and sulfuric acid as main components is coated on a support for an active material and this is used as an electrode plate.

That is, the characteristic of the present invention is not to use lead oxide of such grade of 95% or more in conversion ratio to red lead to be added to paste. The present invention purposefully uses a low grade lead oxide of 90% or less, preferably 70% or less in conversion ratio to red lead and to make efficient use of the properties of such lead oxide.

By employing the above means, both the improvements in life of the battery and in efficiency of formation can be attained, being different from the case where the conventional oxide of high conversion ratio to red lead is added to raw material lead powder for paste. This effect is a phenomenon utterly different from the construction where a lead oxide of high conversion ratio to red lead is mixed with the conventional raw material lead powder for paste containing predominantly lead monoxide and the like and is diluted therewith.

This is also concerned with the structure of particles with progress of conversion to red lead. In general, conversion to red lead progresses from the surface of particles of a low grade oxide which is a raw material and the red lead component surrounds the low grade oxide, inside of the particles, and directly bonds to the low grade oxide. This is the difference from the conventional mixture of ordinary lead powder and an oxide of high conversion ratio to red lead of 95% or more where substantially no low grade oxide is present in the particles.

The course of oxidation for obtaining red lead can be divided into an area of 70% in conversion ratio to red lead where conversion rapidly proceeds in the vicinity of the surface of particles, an area of 70–90% in conversion ratio where oxidation rate somewhat decreases and an area of high grade conversion of 95% or more in conversion ratio to red lead where the conversion slowly proceeds over a long time. In this case, when the particles once converted to red lead are exposed to high temperature for a long time, granulation proceeds, resulting in increase of hardness and such particles are poor in chemical reactivity with sulfuric acid and water at the time of kneading of the paste and become fragile. Such undesired change is greatest at the final stage where a high grade lead oxide of at least 95% in conversion ratio to red lead is produced.

The present invention is characterized by using an oxide which is prepared by purposely discontinuing the conversion to red lead at the stage of 90% or less, preferably 70% or less in conversion ratio to red lead and thus which retains inside a low grade oxide such as PbO which is high in reactivity with sulfuric acid and water and produces binding power at the time of kneading of the paste and which directly bonds to red lead. Thereby not only improvement of efficiency at the step of formation, but also prolongation of the life of the battery are attained.

For attaining both the effects of improvement in efficiency of formation and prolongation of life of battery by the red lead contained in the lead oxide of 90% or less in conversion ratio to red lead, remarkable effects can be obtained when the amount of the red lead in lead oxide is 10% by weight or more per total weight of lead powder considering reactivity with sulfuric acid and increase of binding power of paste. However, especially in order to increase binding power of paste and prolong life of battery, it is preferred to set the amount of the red lead at 50% by weight or less of total weight of lead powder.

If necessary, thereto may be added a high grade red lead powder of 90% or more in conversion ratio to red lead, but in this case, it is also preferred to add at least 80% by weight, based on the total weight of red lead, of lead of low oxide conversion ratio to red lead of 90% or less.

Furthermore, from the point of the above-mentioned binding mechanism, effect to improve the life becomes conspicuous with lowering conversion ratio to red lead to 80%, 70% where low grade oxide is present in a large amount in the particles.

BRIEF DESCRIPTION OF DRAWINGS

FIG. 1 shows relation between $PbO_2$ production rate in the step of formation charging and red lead content in total lead powder where A indicates characteristic when conversion ratio to red lead is changed and B indicates characteristic when a high grade red lead of 98% in conversion ratio to red lead is mixed with a general lead powder.

FIG. 2 is a graph which shows relation between life of battery and red lead content.

BEST MODE FOR CARRYING OUT THE INVENTION

Figure 3:
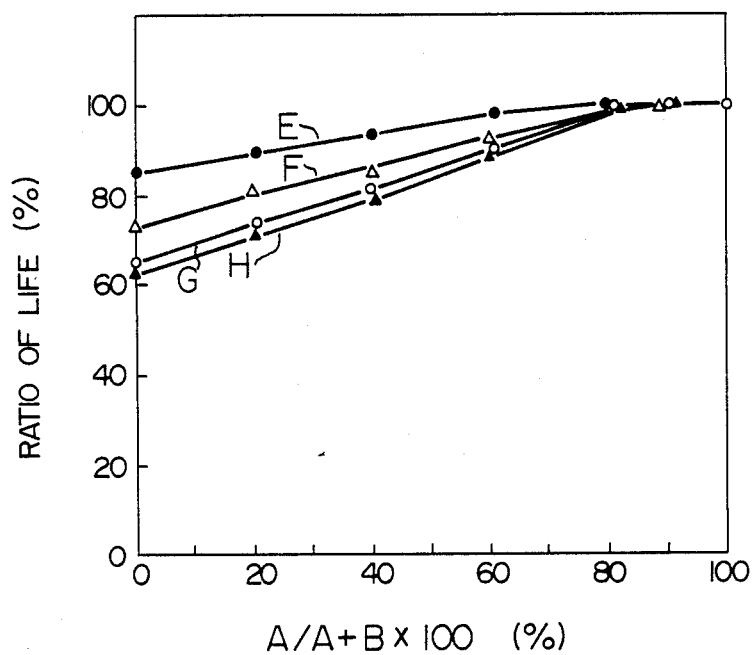
FIG. 3 is a graph which shows life and mixing ratio of powder A adjusted in conversion ratio to red lead and powder B adjusted with powder of high conversion ratio to red lead.

The present invention will be explained in detail by the following examples.

First, various lead oxides different in conversion ratio to red lead were prepared with changing firing (oxidizing) time of a raw material lead powder. Then, if necessary, the resulting lead oxide was mixed with a lead powder of 60-80% in oxidation degree or lead oxide different in conversion ratio to red lead to prepare various lead powders different in content of red lead. Then, given amounts of sulfuric acid and water were added to the above lead powder and these were kneaded to prepare a paste in accordance with a conventional method. This paste was coated on a grid, aged and dried to obtain a positive electrode plate. A lead storage battery of 12 V in voltage and 50 Ah in nominal capacity was made using the above positive electrode plate and was subjected to determination of efficiency of formation charging and life test. Total Pb amount in active material filled was nearly the same in all cases.

First, with reference to influence on charging efficiency, results are shown in FIG. 1 on case A where the content of red lead in total lead powder was changed from 5% to 98% by adjusting a conversion ratio to red lead and case B for comparison where content of red lead was changed by mixing a conventional lead powder with a high grade red lead of 98% in conversion ratio to red lead. Further in order to make efficiency of formation charging clearer, charging quantity in this case was electrical quantity of 100% of stoichiometric number (this was 100% of theoretical amount) required for oxidation of an amount of Pb excluding tetravalent Pb contained in red lead in the total amount of lead (Pb) contained in a positive electrode plate to tetravalence and production rate of $PbO_2$ was determined. As a result, it was recognized that efficiency of formation charging was also markedly improved in the case A where the content of red lead was changed by adjusting a conversion ratio to red lead like the case B where only the conventional high grade red lead was added. Furthermore, characteristics are somewhat different in cases A and B. In case A, effect of efficiency of formation was higher in the region of somewhat low content of red lead and there was a difference from the case B at a content of red lead of at least 10% by weight.

With reference to initial capacity, holding time was examined at $-15°$ C. and 300 A as 5 Hr rate discharging property or low temperature rapid discharging property and in all cases showed correlation with production rate of $PbO_2$. With reference to rapid discharging voltage, better tendency was shown in the region of high red lead content.

Life of battery was determined in the following manner. Batteries with electrode plate containing no red lead was charged with an electrical quantity of 100% of stoichiometric value and other batteries were charged with an electrical quantity of 50% to place them at completely charged state and charging of 3 hours at 14.8 V and discharging of 1 hour at 20 A for each battery were repeated and a voltage at 30 seconds after discharging at 300 A was measured every 50 cycles and number of cycles required for reduction to a voltage of 7.1 V was determined.

FIG. 2 shows a relation between life and content of red lead in the cases A and B, namely, a case where the content of red lead was changed by changing conversion ratio to red lead and a case where content of red lead was changed by mixing a high grade lead oxide of 98% in conversion ratio to red lead and ordinary lead powder.

As is clear from the graph, life was conspicuously deteriorated due to increase of red lead in case B while in case A, life was longer than that of battery with no red lead until 70% in conversion ratio to red lead and showed superiority to case B until 90% in conversion ratio to red lead and was abruptly deteriorated when the conversion ratio exceeded 90%. Remarkable improvement in life was recognized when the content of red lead was up to 10-50%.

Results in case C where the content of red lead was changed with a lead oxide of 90% in conversion ratio to red lead and ordinary lead powder and those in case D where the content of red lead was changed by mixing a lead oxide of 90% in conversion ratio to red lead and a lead oxide of 10% in conversion ratio to red lead are also shown in FIG. 2. As a result, it was found that as in case A, life was improved than case B by mixing a lead oxide of 90% or less in conversion ratio to red lead.

With reference to a mixture of lead oxides of the same content of red lead which were obtained in cases A and B, FIG. 3 shows a relation between mixing ratio and life in case E where a conversion ratio to red lead in A was 10%, in case F of the conversion ratio of 25%, in case G of the conversion ratio of 50% and in case H of the conversion ratio of 70%. As a result, it was found that when oxide of 90% or less in conversion ratio to red lead was mixed in an amount of 80% or more, the effect of the present invention was not basically damaged and, if necessary, oxide of high conversion ratio to red lead may be partially added for the purpose of improving rapid discharging characteristics.

Specific examples of preparation of the paste according to the resent invention are shown below.

EXAMPLE 1

100 Grams of water, 147 g of sulfuric acid having a specific gravity of 1.40 and 2 g of short fibers of a synthetic resin were added to 1 kg of powder comprising a mixture of 68.7 parts by weight of lead powder composed of a lead oxide and metallic lead at a weight ratio of about 3:1 and 31:3 parts by weight of red lead of 80% in conversion ratio to red lead and the resulting mixture was kneaded for about 20 minutes by a stirrer to prepare a paste. Then, this paste was coated at a thickness of about 1.8 mm on an expanded metal made of a lead alloy by a paste filling machine, dried and aged to make a positive electrode plate. A lead storage battery of 12 V in voltage and 50 Ah in nominal capacity was made using the positive electrode plate.

Life characteristic of this lead storage battery is similar to that of C in FIG. 2, and is somewhat lower than that of C.

EXAMPLE 2

In the same manner as in Example 1, 100 g of water, 147 g of sulfuric acid having a specific gravity of 1.40 and 2 g of short fibers of a synthetic resin were added to 1 kg of a powder comprising 64.3 parts by weight of lead powder composed of lead oxide and metallic lead at a weight ratio of about 3:1 and 35.7 parts by weight of red lead of 70% in conversion ratio to red lead and the resulting mixture was kneaded for about 20 minutes by a stirrer to prepare a paste. Then, this paste was coated at a thickness of about 1.8 mm on a lead alloy cast grid which was an active material support by a paste filling machine, dried and aged to make a positive electrode plate. A lead storage battery of the same specification as of the battery made in Example 1 was made using said positive electrode plate.

Life characteristic of this lead storage battery was similar to that of C in FIG. 2 and showed medium characteristic between A and C.

Collective consideration revealed that life as a battery was improved by incorporating a large amount of red lead powder in case A and life cycle did not reach the maximum value, but showed good characteristic close to the maximum value.

Particle size of red lead powder used can be optionally adjusted by grinding and sifting, but preferably the structure is such that as much unoxidized lead monoxide as possible is contained inside and the lead monoxide directly bonds to the red lead component formed on the surface.

It is a matter of course that the present invention includes use of such paste for negative electrode plate.

INDUSTRIAL APPLICABILITY

As explained above, according to the present invention, the contradiction in addition of red lead in conventional manner that efficiency of formation charging can be enhanced while life of battery is deteriorated has been solved by use of lead oxide of low conversion ratio to red lead. Especially, the present invention has attained compatibility of charging efficiency and life performance of paste-type electrode plate which cannot warrant life of battery due to its structure as clad-type electrode plate can. This effect is considered to be essentially based on the fact that amount of red lead component is great which is formed by the surface portion of lead monoxide particle existing as core being partially or mostly converted to red lead and which directly bonds to the lead monoxide of core and the remaining lead monoxide serves enhancement of binding power between active material per se. Therefore, the effect cannot be obtained by mixing separately prepared red lead and ordinary lead powder.

The present invention especially attains compatibility of improvements of efficiency of formation charging and life of battery and the industrial value is very high.

What is claimed is:

1. A method of making an electrode plate for a lead storage battery, which comprises filling a support for an active material with a paste comprised mainly of a lead powder, water and sulfuric acid kneaded together, said lead powder consisting of lead monoxide, a lead oxide convertible to red lead, and metallic lead, the conversion of the lead oxide to red lead being 90 wt% or less.

2. A method for making an electrode plate as in claim 1, wherein the proportion of red lead in said lead oxide converted to the red lead being in the range of 10 to 50% by weight of the entire lead powder.

3. A method according to claim 1 wherein the lead oxide of 90 wt% or less in conversion ratio to red lead is simultaneously included with an oxide of more than 90 wt% in conversion ratio to red lead in the support, the amount of red lead included in said lead oxide of 90 wt% or less in conversion ratio to red lead is 80% by weight or more of the total amount of red lead.

4. A method for making an electrode plate for lead storage battery, characterized by adding 100 g of water, 147 g of sulfuric acid having a specific gravity of 1.40 and 2 g of short fibers of a synthetic resin to 1 kg of a powder prepared by mixing 31.3 parts by weight of a lead oxide of 80% in conversion ratio to red lead and 68.7 parts by weight of a lead powder comprising a lead oxide and a metallic lead at a weight ratio of about 3:1, kneading the mixture to obtained a paste and coating the paste onto a support for an active material and drying and aging the paste.

5. A method for making an electrode plate for lead storage battery, characterized by adding 100 g of water, 147 g of sulfuric acid having a specific gravity of 1.40 and 2 g of short fibers of a synthetic resin to 1 kg of a powder prepared by mixing 35.7 parts by weight of a lead oxide of 70% in conversion ratio to red lead and 64.3 parts by weight of a lead powder comprising a lead oxide and a metallic lead at a weight ratio of about 3:1, kneading the mixture to obtain a paste and coating the paste onto a support for an active material and drying and aging the paste.

* * * * *